(12) United States Patent
Gertmar et al.

(10) Patent No.: US 7,667,439 B2
(45) Date of Patent: Feb. 23, 2010

(54) POWER CONVERTER ARRANGEMENT AND METHOD

(75) Inventors: Lars Gertmar, Vasteras (SE); Erik Koldby, Odense (DK); Hans C. Christensen, Copenhagen (DK); Jouko Niiranen, Helsinki (FI); Leif-Erik Wraae, Västerås (SE); Håkan Korske, legal representative, Västerås (SE)

(73) Assignee: ABB Research Ltd. (CH)

( * ) Notice: Subject to any disclaimer, the term of this patent is extended or adjusted under 35 U.S.C. 154(b) by 0 days.

(21) Appl. No.: 12/395,088

(22) Filed: Feb. 27, 2009

(65) Prior Publication Data

US 2009/0218820 A1    Sep. 3, 2009

Related U.S. Application Data

(63) Continuation of application No. PCT/SE2006/000992, filed on Aug. 30, 2006.

(51) Int. Cl.
    *H20P 9/46* (2006.01)
(52) U.S. Cl. .............................. 322/47; 322/44; 322/46; 322/54
(58) Field of Classification Search ................... 322/47, 322/46, 44, 54
    See application file for complete search history.

(56) References Cited

U.S. PATENT DOCUMENTS

| | | | |
|---|---|---|---|
| 6,411,067 B1 | 6/2002 | Björklund | |
| 7,309,974 B2* | 12/2007 | Sarlioglu et al. | 322/47 |
| 7,555,367 B2* | 6/2009 | Kuge | 701/1 |
| 7,595,612 B2* | 9/2009 | Ganev et al. | 322/46 |

FOREIGN PATENT DOCUMENTS

EP    1 557 925 A2    7/2005

OTHER PUBLICATIONS

International Search Report and Written Opinion, Apr. 10, 2007, 8 pages.
Preliminary Report on Patentability, Apr. 30, 2008, 8 pages.
Ahmed T, et al.: "Advanced Control of PWM converter with variable-speed induction generator", IEEE Transactions on Industry Applications, Jul.-Aug. 2006, IEEE, USA.

* cited by examiner

*Primary Examiner*—Nicholas Ponomarenko
*Assistant Examiner*—Iraj A Mohandesi
(74) *Attorney, Agent, or Firm*—St. Onge Steward Johnston & Reens LLC

(57) ABSTRACT

A power converter arrangement for connecting an induction generator to an electric power network comprises a first path provided for transferring electric power from the induction generator to the electric power network during a first operation condition, and a second path provided for transferring electric power from the induction generator to the electric power network during a second operation condition, where the first path includes an AC-AC converter and the second path includes a switch. A capacitor arrangement is interconnected between the induction generator and the first and second paths and a first AC reactor device is interconnected between the capacitor arrangement and the first and second paths, where the capacitor arrangement is provided for compensating for a magnetization current of the induction generator.

8 Claims, 2 Drawing Sheets

POWER CONVERTER ARRANGEMENT AND METHOD

CROSS-REFERENCE TO RELATED APPLICATIONS

The present application is a continuation of pending International patent application PCT/SE2006/000992 filed on Aug. 30, 2006 which designates the United States, the content of which is incorporated herein by reference.

FIELD OF THE INVENTION

The present invention relates generally to electric power installations, and more specifically the invention relates to a power converter arrangement and a method for transferring electric power.

BACKGROUND OF THE INVENTION

The exploitation of wind resources has been rapidly growing during the last years. However, the use of wind power provides not only energy, but also a negative impact to the power grid, to which it is connected. Not only changes in the wind but also the wind turbines themselves create power pulsations.

A solution is to use variable speed operation of the turbines by using transistor converters. The power quality can be improved, but at higher wind speeds the variable speed system has a lower efficiency compared to a fixed speed system.

To overcome such limitation converters may be used only at lower powers where there is an energy gain and use directly-connected induction generators at higher wind speeds as being disclosed in Power Quality Impact of a Sea Located Hybrid Wind Park, T. Thiringer, T. Petru, and C. Liljegren, IEEE Transactions on Energy Conversion, Vol. 16, No. 2, June 2001, p. 123.

Such a power converter arrangement for a wind turbine is shown in FIG. 1 during operation at lower and higher wind speeds. The arrangement includes two power converters 11a, 11b provided for accomplishing the variable speed operation at the lower wind speeds. At the higher wind speeds the constant speed operation is accomplished by connecting the induction generator 13 directly to the power grid 15. In this mode the power converter on the power grid side operates as a reactive power source with the purpose of providing a desired amount of reactive power and to reduce the voltage variations on the power grid caused by the active power variations from the wind turbine.

A similar power converter arrangement is disclosed in U.S. Pat. No. 7,012,409 B2 (SEMIKRON). A triggering method for power compensation in the event of a short circuit is also disclosed.

SUMMARY OF THE INVENTION

For larger turbine ratings than 3 MW, the magnetization of the air gap in brush-less induction generators will result in a magnetization current which is comparable to the torque-producing current. At such conditions the available downrating of the power converter arrangement is limited to about 30%.

For larger turbine ratings than 1 MW, it is essential to overcome the inherent torque-speed stiffness in induction generators with high-efficient rotors. An immediate solution to this problem is to increase the rotor resistance internally in the induction generator. This is, however, limited to somewhat above 2 MW due to limited cooling capabilities.

A general object of the present invention is therefore to provide a power converter arrangement and a method for transferring electric power, respectively, by which the above problems and limitations are at least alleviated.

In this respect there is a particular object of the invention to provide such an arrangement and such a method, which are flexible, reliable, and of reasonable cost.

These objects, among others, are according to the present invention attained by arrangements and methods as specified in the appended patent claims.

According to a first aspect of the invention a power converter is provided, which comprises two parallel paths provided for transferring electric power from an induction generator to an electric power network during different operation conditions, wherein a first one of the paths comprises an AC-AC converter and the second one of the paths comprises a switch. A capacitor arrangement is interconnected between the induction generator and the first and second paths and a first AC reactor device is interconnected between the capacitor arrangement and the first and second paths, wherein the capacitor arrangement is provided for compensating for a magnetization current of the induction generator.

Hereby, the AC-AC converter may have a power rating of less then 30% of the power rating of the turbine and the induction generator, even for turbine and induction generator ratings above about 3 MW.

Preferably, a second AC reactor device is interconnected between the first and second paths and the electric power network.

Hereby, a cost-efficient arrangement is achieved, which stabilizes or de-stabilizes the induction generator to solve the problem of inherent torque-speed stiffness at ratings above 1 MW.

According to a second aspect of the invention a method is provided for transferring electric power from an induction generator to an electric power network by the above arrangement. The method comprises the step of compensating for the magnetization current of the induction generator by the capacitor arrangement.

Further characteristics of the invention and advantages thereof, will be evident from the following detailed description of embodiments and variants of the present invention given hereinafter and the accompanying FIG. 2, which is given by way of illustration only and thus, is not limitative of the present invention.

DETAILED DESCRIPTION OF THE INVENTION

Figure 1:
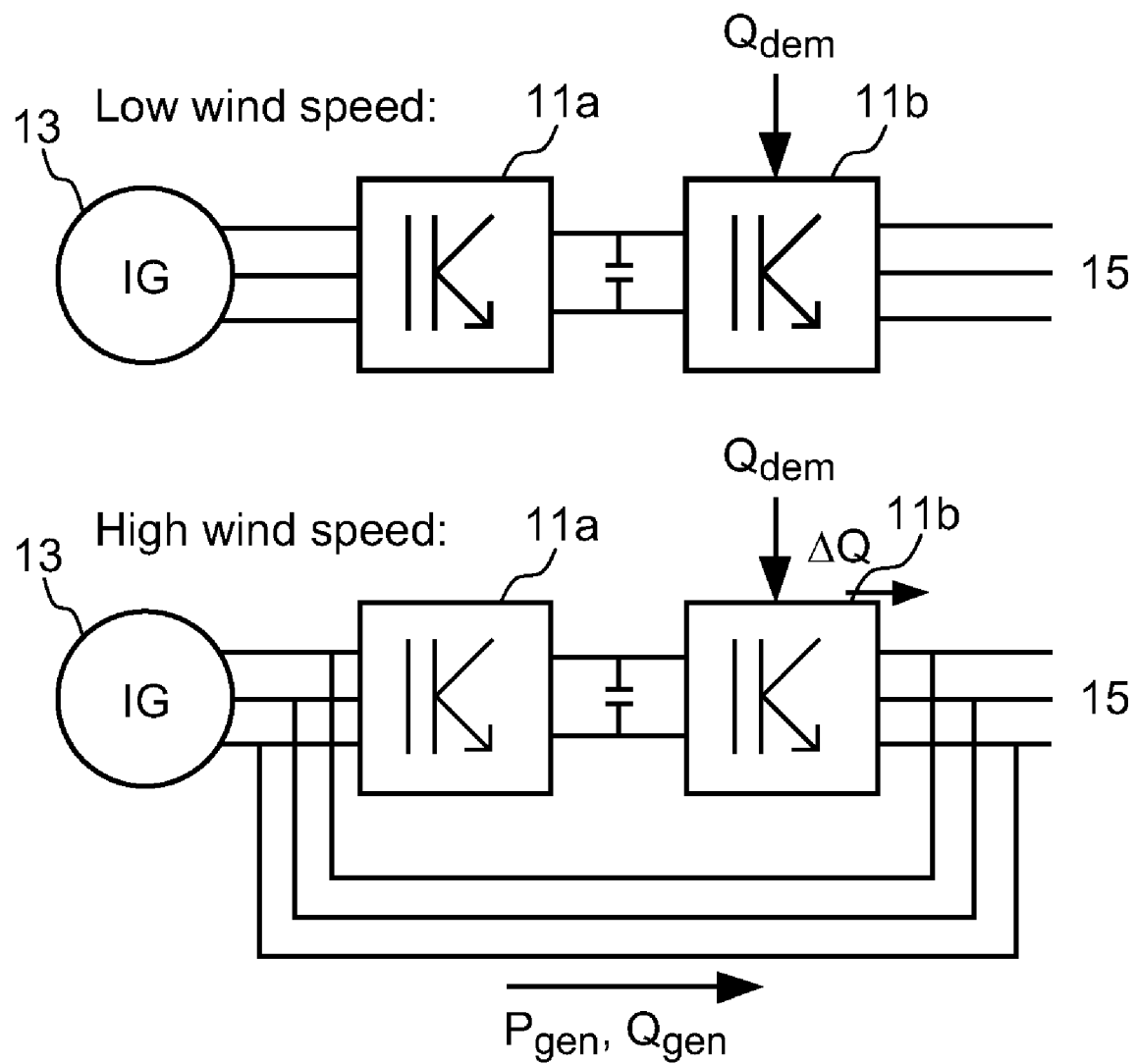
FIG. 1 illustrates schematically a power converter arrangement according to prior art.
Figure 2:
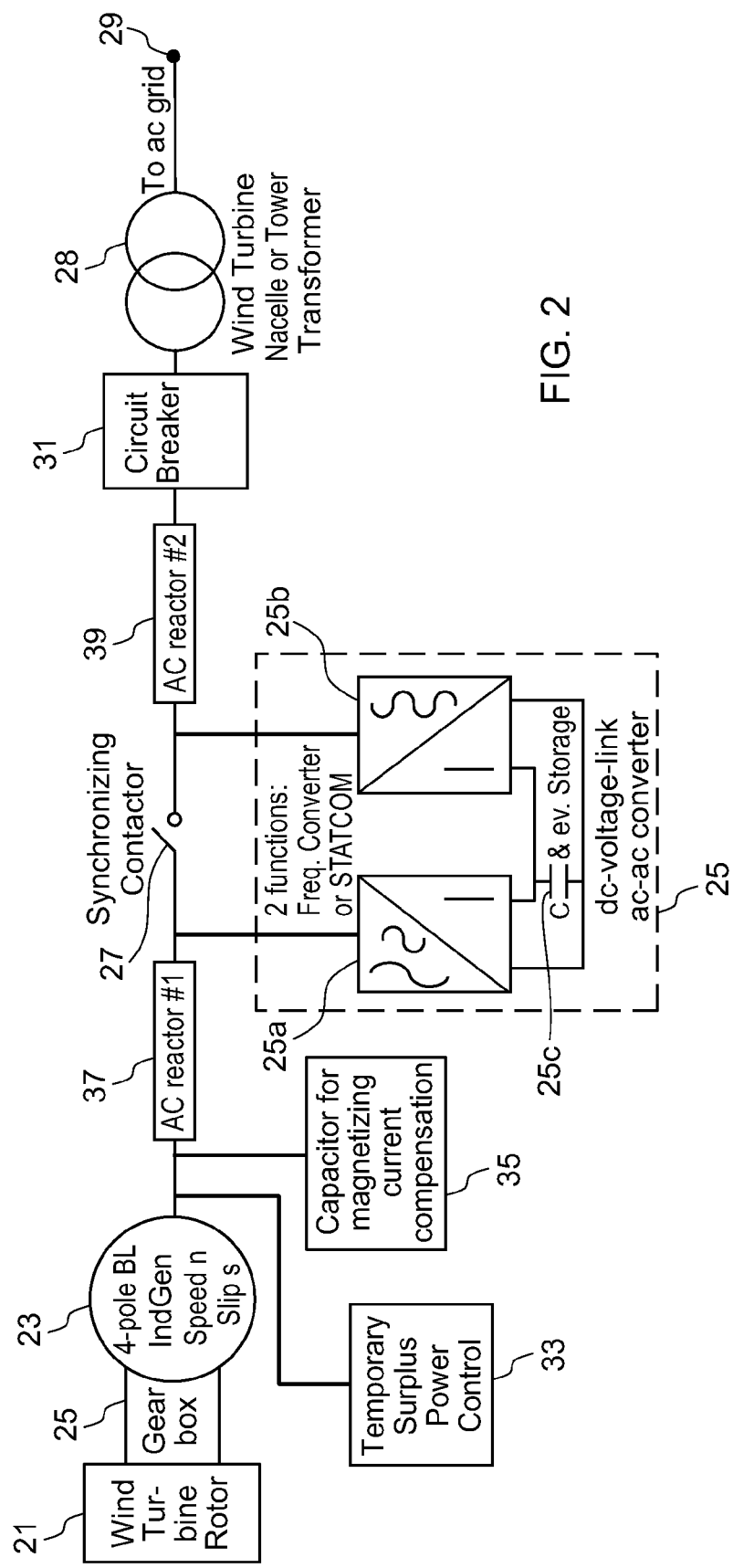
FIG. 2 illustrates schematically, in single-line and block diagram, a three-phase power converter arrangement according to an embodiment of the present invention.

The power converter arrangement as shown in FIG. 2 connects a brush-less three-phase induction generator 23 to a three-phase electric power grid or network 29. The generator is driven by a wind turbine rotor 21 via a gear box 25. The power converter arrangement comprises two parallel paths: a first path including an AC-AC converter 25 and a second path including a switch 27.

The AC-AC converter 25 comprises preferably an AC-DC converter 25a and a DC-AC converter 25b interconnected by a capacitor 25c as being disclosed in the above-cited article Power Quality Impact of a Sea Located Hybrid Wind Park, T. Thiringer, T. Petru, and C Liljegren, IEEE Transactions on Energy Conversion, Vol. 16, No. 2, June 2001, p. 123, and in U.S. Pat. No. 7,012,409 B2 (SEMIKRON), the contents of which being hereby incorporated by reference. Alternatively, the AC-AC converter 25 can be embodied without a DC-voltage link. It is possible to use any AC-AC converter which is capable of frequency conversion from a low frequency up to at least the power grid frequency for synchronizing, and capable of reactive power production. An example of an AC-AC converter without a DC-voltage link is the so-called matrix converter. The AC-AC converter is preferably rated for low voltage, e.g. 400-1000 V AC.

During operation at lower wind speeds, the switch 27 is open and the AC-AC converter 25 is provided for accomplishing variable speed operation. Reactive power is thereby supplied both towards the induction generator 23 and towards the power network.

Further, a wind turbine nacelle or tower transformer 28 and a circuit breaker 31 may be interconnected between the parallel paths and the electric power grid or network 29. The transformer is provided for transforming the low or low-to-medium-voltage power output from the induction generator, e.g. 690 V, to high voltage power such as e.g. 10 kV.

A control system (not explicitly illustrated), preferably a computerized controller, is provided for the control of the turbine and of the power converter arrangement.

During operation at higher wind speeds, the switch 27 is closed and constant (or semi-variable) speed operation is maintained. The AC-AC converter 25 is here operating as a shunt element, to still supply reactive power both towards the induction generator and towards the power network.

When reaching the power network frequency from the low speed/power end, the induction generator 23 is synchronized to the power network 29 and the switch 27 is closed. When reaching the low power mode from the high power/speed end, the induction generator 23 is desynchronized from the power network 29 and the switching device/function is opened.

The power converter arrangement comprises further, in accordance with the present invention, a capacitor arrangement 35 interconnected between the induction generator 23 and the parallel paths. Conveniently, the capacitor arrangement comprises capacitors connected in Y or Δ configuration.

By means of connecting the capacitors to the terminals of the induction generator 23 the magnetization current of the induction generator 23 can be compensated for, and as a consequence thereof, the AC-AC converter 25 may have a power rating of less then 30% of the power rating of the turbine and the induction generator 23 even when the power rating of the wind turbine and the induction generator 23 is above about 3 MW. It is probably possible to reach a power rating as low as 15% of the power rating of the turbine and the induction generator.

A first AC reactor device 37 is interconnected between the capacitor arrangement 35 at the terminals of the induction generator 23 and the parallel paths including the AC-AC converter 25 and the switch 27, respectively. The first AC reactor device 37 operates as a matching filter so that direct connection of the capacitor arrangement to an active rectifier, i.e. the AC-DC converter 25a or the DC-AC converter 25b, can be avoided.

Further, a second AC reactor device 39 is interconnected between the parallel paths and the electric power network. The first and second AC reactor devices 37, 39 may together with the AC-AC converter 25 resemble a very long power line with a static VAr compensation device located half-way along the power line for reactive power compensation. Hereby, a cost-efficient manner to stabilize or de-stabilize the induction generator 23 to solve the problem of inherent torque-speed stiffness at turbine and induction generator ratings above about 1 MW is achieved.

Static VAr compensation devices may be added at suitable locations in the collection grid to coordinate reactive power compensation in the turbine nacelles as well as in the collection grid. For instance, a fixed filter capacitor FC may be provided to fulfill the reactive power requirements.

The AC-AC frequency converter can thus be operated as an active filter, as a flicker eliminator and/or as a smoother via small variations around a desired steady-state point. It may also control the capacitor voltage in a fixed filter capacitor so that it almost instantaneously brings the capacitor voltage thereof to its pre-fault value.

At transient occurrences like grid faults, the power converter arrangement of the invention may further be arranged for any of the following as being disclosed in U.S. provisional patent application No. 60/712,125 (GERTMAR ET AL.), the contents of which being hereby incorporated by reference.

At high power and constant or semi-variable speeds, rapid desynchronization is performed and a resistive temporary surplus power control 33 is engaged (i.e. the power converter arrangement is operated to deliver reactive power to the induction generator, which is temporarily loaded by the resistive temporary surplus power control) or a transient booster is rapidly engaged. The transient booster is also detailed in WO 2005/062438 (ABB RESEARCH), the contents of which being hereby incorporated by reference.

At low power and variable low speeds, the variable speed is kept and at a certain point the resistive temporary surplus power control 33 is engaged or the transient booster is rapidly engaged and the resistive temporary surplus power control 33 is engaged at a later stage.

While the fault is cleared the wind turbine's pitch controller brings the rotor speed to normal steady-state values, and the resistive temporary surplus power control is disengaged when normal steady-state values are reached.

The power converter arrangement of the present invention may further, or alternatively, comprise the triggering mechanism for reactive power compensation in the event of a network short circuit as being disclosed in U.S. Pat. No. 7,012,409 B2 (SEMIKRON).

It shall be appreciated that the various features of the present invention may be combined to reach still further embodiments and variants thereof.

What is claimed is:

1. A power converter arrangement for connecting an induction generator to an electric power network, the power converter arrangement comprising:
   a first path provided for transferring electric power from said induction generator to said electric power network during a first operation condition, the first path comprising an AC-AC converter; and
   a second path provided for transferring electric power from said induction generator to said electric power network during a second operation condition, the second path comprising a switch, characterized in
   a capacitor arrangement interconnected between said induction generator and said first and second paths, the capacitor arrangement being provided for compensating for a magnetization current of the induction generator; and
   a first AC reactor device interconnected between said capacitor arrangement and said first and second paths.

2. The arrangement of claim 1 wherein a second AC reactor device is interconnected between said first and second paths and said electric power network.

3. The arrangement of claim 1 wherein said AC-AC converter has a power rating of less then 30% of a power rating of said induction generator.

4. The arrangement of claim 1 wherein a power rating of the induction generator is at least about 1 MW.

5. The arrangement of claim 1 wherein a power rating of the induction generator is at least about 3 MW.

6. The arrangement of claim 1 wherein said arrangement is provided for reactive power compensation during both said first and said second operation conditions.

7. The arrangement of claim 1 comprising a fixed filter capacitor device for reactive power compensation, wherein said AC-AC converter controls a capacitor voltage of said fixed filter capacitor device.

8. The arrangement of claim 1 wherein a reactive power compensation arrangement is provided for reactive power compensation in the event of a voltage drop in the electric power network.

* * * * *